Figure 1:
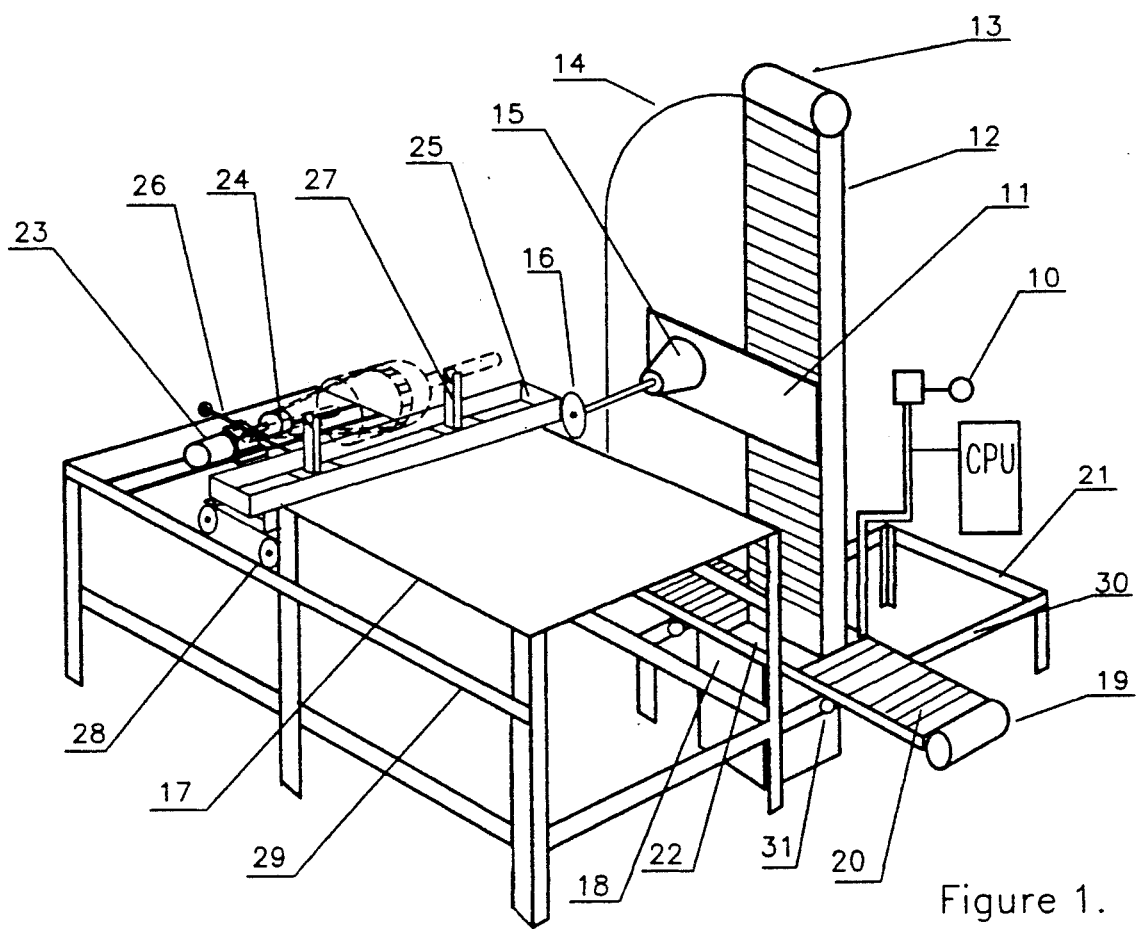

United States Patent
Wachs

Patent Number: 5,305,671
Date of Patent: Apr. 26, 1994

[54] UNIVERSAL COIL CUTTER

[76] Inventor: Theodore C. Wachs, 6164 Norfolk Dr., Parma, Ohio 44134

[21] Appl. No.: 4,979

[22] Filed: Jan. 15, 1993

[51] Int. Cl.$^5$ .............. B23D 45/02; B23D 47/04; B23D 47/08
[52] U.S. Cl. .............................. 83/76.1; 83/676; 83/471.2; 83/474; 83/477.1; 83/488; 83/924; 83/412; 29/762; 82/48; 82/101
[58] Field of Search ............... 83/76.1, 676, 477.1, 83/471.2, 474, 477, 487, 488, 489, 907, 924, 412, 418, 421; 29/762, 598; 82/48, 83, 161

[56] References Cited

U.S. PATENT DOCUMENTS

| 4,218,818 | 8/1980 | Panzica | 29/762 |
| 4,488,463 | 12/1984 | Pontarella | 82/101 X |
| 5,109,899 | 5/1992 | Henderickson | 83/471.2 X |

OTHER PUBLICATIONS

Epoxylite #972, Shelby Horizontal Coil Cut-Off Machine, Sales Brochure, Mar. 7, 1978.
S & W, Model SW1100 Saw, Sales Brochure, Publication date unknown.

Primary Examiner—Richard K. Seidel
Assistant Examiner—Raymond D. Woods

[57] ABSTRACT

A universal coil cutter for reclaiming dynamo electric machines. Specifically to cut-off the end turns of the coils of stators, rotors or armatures. The coil cutter consisting of a direct drive cutter(16), spindle and motor(15) and motor driven carriages for the x-axis(22) and the y-axis(12). The above are controlled with a joystick(10) and operate in a third plane on the z-axis(21). The table (17) is used to support the stators which are being reclaimed. Adjacent to the table(17) is a carriage with base(25) and journal (27) and rotor drive motor (23). Attached thereto a rotor drive pulley(24). The rotor belt tensioner(26) takes up slack in the drive belt which loops over and around the rotor and the drive pulley(24).

3 Claims, 1 Drawing Sheet

U.S. Patent    Apr. 26, 1994    5,305,671

UNIVERSAL COIL CUTTER

BACKGROUND—FIELD OF INVENTION

This invention relates to electric motor rebuilding, specifically to reclaiming the laminated iron core by cutting the exposed coil end turns, and burning off the varnish and insulation, then pulling out the remaining part of the coils.

BACKGROUND—DESCRIPTION OF PRIOR ART

Dynamo-electric machines such as electric motors and generators, have laminated iron cores. In these iron cores are wound coils of electric wire, in a manner well known to the art. Stators, rotors, and armatures such as those referenced to here, can be rebuilt for reuse by the well known art of severing and removing of coils of windings. The cores are then rewound with electric wire and then reused in the motor. The rebuilding of these motor windings is in most cases economically prudent.

Various methods have been used in the past to cut the end turns from the windings of a stator. The most common is a horizontal coil cut-off machine. This machine is mounted on rails, and it has a spindle which is connected by belts and pulleys which are driven by a motor. This spindle, having considerable weight, is counter balanced by several springs. The spindle, which holds the cutting tool is manipulated by the operator to cause the cutter to move in a circular plane. Another type of machine is a vertical coil cutter. This machine is mounted in a vertical position so that the spindle and cutter are pointing down into the stator bore, with the stator turned over on its side. Both of these machines suffer from some important disadvantages:

(a) They both use belts and pulleys to power their drive train. Belts and pulleys tend to slip and wear after a short time.

(b) They both require the manual manipulation of the spindle and cutter in order to sever the end turns of the stator windings.

(c) During the operation the operator must be in close proximity to the hazards of possible flying debris and, or fiberglass and copper dust.

(d) These machines are not able to sever the end turns of coils on rotors or armatures. They are used to sever end turns of coils and stators only.

OBJECTS AND ADVANTAGES

Consequently, several objects and advantages of the universal coil cutter are:

(a) To provide motor driven carriages for the spindle and the cutter. This eliminates manual operation.

(b) To use a directly driven spindle and cutter, to eliminate slipping.

(c) To employ the use of a remote control such as a joystick, or a computer, which decreases the safety and health hazards.

(d) To provide a method of severing the end turns of the coils on rotors and armatures.

DRAWING FIGURES

FIG. 1. A perspective view of the universal coil cutter with the rotor stand in the retracted position.

REFERENCE NUMERALS IN DRAWINGS

| | |
|---|---|
| 10 Joystick | 11 Y-axis carriage |
| 12 Y-axis | 13 Y-axis drive |
| 14 Shield | 15 Spindle motor |
| 16 Cutter | 17 Table |
| 18 Control box | 19 X-axis drive |
| 20 X-axis | 21 Z-axis |
| 22 X-axis carriage | 23 Rotor drive motor |
| 24 Rotor drive pulley | 25 Base |
| 26 Rotor belt tensioner | 27 Journal |
| 28 Track wheel | 29 Track |
| 30 Rail | 31 Rail wheel |

DESCRIPTION—FIG. 1

A typical embodiment of the Universal coil cutter is illustrated in FIG. 1 (perspective view). The table 17 is constructed of angle iron and steel plate so that it can withstand the weight of large motors. The rotor base 25 is constructed of square tubing and angle iron. The rotor base is mounted on steel track wheels 28 which ride on angle iron track 29. The journal 27 is constructed of square tubing and angle iron with a "v" notch on the top. The rotor belt tensioner 26 is a lead screw assembly. The rotor drive motor 23 is a motor with gear reducer with sufficiently slow output speed as to enable the cutter 16 to cut the rotor coil end turns.

The Z-axis 21 is constructed of square tubing and angle iron of sufficient strength to support the x-axis 20, and the Y-axis 12. The square tubing will act as rails 30 to support the x-axis 20 which is mounted on steel rail wheels 31.

The x-axis 20 and the Y-axis 12 are constructed of cast aluminum plate. This type of axis construction using lead screws are well known in the art. (lead screws are not shown). The Y-axis 12 is mounted on the x-axis carriage 22. The X-axis carriage 22 is mounted on the x-axis 20 and is connected with a lead screw to the x-axis drive 19. The Y-axis carriage 11 is mounted on the y-axis 12 and is connected with a lead screw to the y-axis drive 13. The spindle motor 15 is mounted on the y-axis carriage 11. The cutter 16 is connected directly to the spindle motor 15. The shield 14 is clear poly-carbonate impact resistant plastic. The joystick 10 is located behind the shield 14 and is connected to the control box 18.

The construction materials used are not necessarily the only materials that can be used. These materials were used only as a matter of convenience and in many instances any number of other materials could have been used. Instead of square tubing, round tubing or even solid rectangular materials of equal strength could be used.

It is evident that the description above points out several advantages of my universal coil cutter:

(a) The joystick can be operated by almost anyone, there is little strength required.

(b) The operator is located away from the actual cutting operation.

(c) The motor operated x and y axes will move the cutter with more power, speed, stability and greater ease.

OPERATION—FIG. 1

There are two phases to the operation of the universal coil cutter.

(a) The stator coil cutter (b) The rotor or armature coil cutter.

The rotor is the rotating part in an electric motor whereas the stator is the stationary part. The stator coils are wound within the bore of a stator. The rotor coils are wound on the outside of the rotor core.

The stator coil cutter will be the subject of this discussion. The stator is placed on the table 17. A chain binder is used to clamp the stator to the table 17 (the chain binder is not shown). The chain binder is well known in the art. The spindle motor 15 is moved along the z-axis 21 to position the cutter 16 as close as possible to the stator core. The cutter 16 is then moved in a circular plane by manipulating the joystick 10. The joystick 10 can activate the y-axis drive 13, or the x-axis drive 19 and is in this manner able to achieve circular motion in a plane. The coil end turns are then severed in this manner.

The second phase, or the rotor coil cutting operation will now be addressed. The journals 27 are adjusted to accommodate the bearing sections on the rotor. The rotor is placed in the journals 27 and the drive belt(not shown) is looped over the rotor drive pulley 24 and the rotor, while the rotor belt tensioner 26 is adjusted in order to take up the slack in the drive belt. The drive belt is well known in the art. The cutter 16 is positioned to cut the coils on the rotor. Using the joystick 10 The cutter 16 is moved into the rotor winding until the cut is at the proper depth. The rotor drive motor 23 is then allowed to turn the rotor at least one complete turn. The entire circumference of the windings are then severed.

SUMMARY, RAMIFICATIONS, AND SCOPE

Thus, the reader will see that this invention the universal coil cutter, will greatly facilitate the cutting and removal of the end turns of stators and rotors. This in turn will make the reclaiming of faulty dynamo electric machines more profitable.

it permits the operator to work in a safer environment and therefore is more cost effective.
  it provides for easier, faster, cutting and removal of stator coils
  it provides for easy cutting and removal of armature and rotor coils.
  it provides a direct drive spindle which will not jam under severe conditions.

Although the descriptions above contain many specifics, these should not be construed as limiting the scope of the invention but merely providing illustrations of some of the presently preferred embodiments of this invention. For example, the z-axis can be motor driven or not. The control can be with push buttons or with computer.

Thus the scope of the invention should be determined by the appended claims and legal equivalents, rather than by the examples given.

I claim:

1. An apparatus for cutting end turns of stator, rotor and armature windings comprising:
   a motor within a support housing, an extended shaft attached to said motor, a saw attached to said shaft, and bearings within said support housing for supporting said shaft, said support housing mounted on a y-axis motor driven carriage which is mounted on an x-axis motor driven carriage which in turn is mounted on a z-axis carriage above a table for supporting a first workpiece with said end turns in a first cutting mode, a control means which communicates with a drive motor of each of said y-axis and said x-axis motor driven carriages to move the saw in a path around the first workpiece while cutting a plurality of said windings in said first cutting mode, and rails to support a workpiece stand on said table which allows for rotary motion of a second workpiece with said end turns in a second cutting mode, and a drive belt for looping around a diameter of the second workpiece and a drive pulley for imparting said rotary motion, the control means moving said saw into the windings of said second workpiece to position said saw to cut off a plurality of said windings of said second workpiece as said second workpiece is rotated in said second cutting mode.

2. The apparatus of claim 1 wherein said control means includes a joystick.

3. The apparatus of claim 1 wherein said control means is a computer.

* * * * *